US012692128B2

(12) United States Patent
Hakala et al.

(10) Patent No.: US 12,692,128 B2
(45) Date of Patent: Jul. 28, 2026

(54) MULTICAR ELEVATOR SYSTEM

(71) Applicant: KONE Corporation, Helsinki (FI)

(72) Inventors: Tero Hakala, Helsinki (FI); Tuukka Korhonen, Helsinki (FI); Pasi Raassina, Helsinki (FI); Antti Kallioniemi, Helsinki (FI); Henry Piitulainen, Helsinki (FI); Vuokko Löksy, Helsinki (FI); Ari Koivisto, Helsinki (FI)

(73) Assignee: KONE Corporation, Helsinki (FI)

(*) Notice: Subject to any disclaimer, the term of this patent is extended or adjusted under 35 U.S.C. 154(b) by 1300 days.

(21) Appl. No.: 17/468,180

(22) Filed: Sep. 7, 2021

(65) Prior Publication Data

US 2022/0073314 A1 Mar. 10, 2022

(30) Foreign Application Priority Data

Sep. 7, 2020 (EP) .................................... 20194825

(51) Int. Cl.

*B66B 9/00* (2006.01)
*B66B 1/24* (2006.01)
*B66B 1/34* (2006.01)
*B66B 5/00* (2006.01)
*B66B 11/04* (2006.01)

(52) U.S. Cl.

CPC ................ *B66B 9/003* (2013.01); *B66B 1/24* (2013.01); *B66B 1/3461* (2013.01); *B66B 5/0025* (2013.01); *B66B 5/0087* (2013.01); *B66B 11/0407* (2013.01)

(58) Field of Classification Search

CPC ......... B66B 5/0087; B66B 9/003; B66B 1/24; B66B 1/3461; B66B 5/0025; B66B 11/0407

USPC .......................................................... 187/247

See application file for complete search history.

(56) References Cited

U.S. PATENT DOCUMENTS

2011/0067958 A1 3/2011 Schuster et al.
2018/0022573 A1* 1/2018 Hsu ....................... B66B 5/0087 187/247
2018/0044138 A1* 2/2018 Roberts ............... B66B 11/0226
2018/0334363 A1* 11/2018 Saarela ................. B66B 13/146

FOREIGN PATENT DOCUMENTS

EP 3 124 419 A1 2/2017

* cited by examiner

*Primary Examiner* — Jorge L Carrasquillo
(74) *Attorney, Agent, or Firm* — Birch, Stewart, Kolasch & Birch, LLP

(57) ABSTRACT

The invention relates to a multicar elevator system, comprising: a plurality of elevator cars; an elevator shaft system; the plurality of the elevator cars and the elevator shaft system comprising a plurality of elevator components; a controller; the multicar elevator system further comprising: an elevator maintenance system configured to: receive the measurement data; determine the operational condition of the respective elevator component; and generate a maintenance signal for the at least one elevator component, a maintenance is scheduled in accordance with the operational condition of the respective at least one elevator component before a failure of the at least one elevator component. The invention also relates to a method and a computer program product.

19 Claims, 2 Drawing Sheets

MULTICAR ELEVATOR SYSTEM

TECHNICAL FIELD

The invention concerns in general the technical field of elevators. More particularly, the invention concerns a multicar elevator system.

BACKGROUND

In a multicar elevator system, there are a plurality of elevator cars adapted to move along a common circular path sequentially, in the same direction of circulation. Cars will move upwards along a first shaft and downwards along a second, parallel shaft. Transfer from one shaft to another will take place in a horizontal direction via transfer stations, disposed within top and bottom end terminals of the shaft. In some embodiments, propulsion force for the cars is provided by a linear motor. Each elevator car may have a mover co-acting with a common stator beam which allows the elevator cars being individually controllable.

Sequential, circular motion along a common trajectory path means that a single car failure may block the entire elevator system since there is no way to by-pass the elevator car in question. This means that such a multicar elevator system is highly vulnerable for operational anomalies.

In a document EP3124419 A1 it is disclosed a solution for solving the above-described situation. Namely, the document introduces a maintenance car which can be used for repairing the elevator car having the failure or for towing the failed car away from the blocking position. However, also this approach requires that the elevator system is run down until the blocking elevator car is removed from the travel path.

Hence, there is a need to introduce solutions facilitating decrease of downtime in the multicar elevator systems.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present an elevator system, a method, and a computer program for maintaining the elevator system.

The objects of the invention are reached by an elevator system, a method, and a computer program as defined by the respective independent claims.

According to a first aspect, a multicar elevator system is provided, the multicar elevator system comprising: a plurality of individually controllable elevator cars; an elevator shaft system having at least two vertical shafts and at least two transfer stations forming a common circular path for the plurality of elevator cars; the plurality of the elevator cars and the elevator shaft system comprising a plurality of elevator components, at least some of the plurality of the elevator components are equipped with at least one sensor adapted to generate measurement data representing an operational condition of a respective elevator component; a controller communicatively connected at least to the elevator components equipped with the sensor for receiving the measurement data; the multicar elevator system further comprising: an elevator maintenance system configured to: receive the measurement data; determine the operational condition of the respective elevator component on a basis of the received measurement data; and generate a maintenance signal carrying maintenance data for performing a maintenance of the at least one elevator component, the maintenance is scheduled in accordance with the operational condition of the respective at least one elevator component before a failure of the at least one elevator component.

Preferably, at least some of the plurality of the elevator components of the elevator cars and the elevator shaft system are equipped with at least one sensor adapted to generate measurement data representing an operational condition of a respective elevator component.

The elevator maintenance system may be remote to a location where the plurality of elevator cars is arranged to operate.

For example, the elevator maintenance system may be arranged communicatively connected to a maintenance operator entity for a delivery of at least a portion of the maintenance data.

Further, the individually controllable elevator cars and the elevator shaft system may be implemented in the multicar elevator system so that a motor primary of a linear motor is implemented in the elevator shaft system and a motor secondary of a linear motor is implemented in the individually controllable elevator cars.

Each of the at least two transfer stations may comprise a horizontal shaft section for horizontal movement of individually controllable elevator cars from one vertical shaft to another.

Still further, the elevator shaft system may comprise at least one maintenance space arranged outside of the common circular path the individually controllable elevator cars are arranged to travel; and wherein the controller may be configured to generate a control signal to at least one elevator car for accessing the maintenance space based on data included in the maintenance signal.

The controller of the multicar elevator system may be configured to run the multicar elevator system in one of the following operational modes: a first operational mode in which the individually controllable elevator cars are arranged to move in the circular path consecutive to each other; a second operational mode in which a motion of at least one of the individually controllable elevator cars deviates from a circular motion along the circular path; and wherein the elevator maintenance system may be configured to schedule at least one maintenance work indicated in the maintenance signal to the second operational mode.

The maintenance signal may comprise data defining an instant of time of a maintenance. Alternatively or in addition, the maintenance signal may comprise data identifying the at least one elevator component subject to the maintenance. Alternatively or in addition, the maintenance signal may comprise data representing a location of the at least one elevator component subject to the maintenance. Alternatively or in addition, the maintenance signal may comprise data defining status of the at least one elevator component subject to the maintenance. Alternatively or in addition, the maintenance signal may comprise data for on-site identification of the at least one elevator component subject to the maintenance. Alternatively or in addition, the maintenance signal may comprise data indicating tools and/or software update for the maintenance of the at least one elevator component subject to the maintenance.

Still further, the elevator maintenance system may be integrated in a plurality of multicar elevator systems locating at different geographical locations for generating maintenance signals for the plurality of the multicar elevator systems.

According to a second aspect, a method for performing a maintenance of a multicar elevator system is provided, the multicar elevator system comprising: a plurality of individually controllable elevator cars; an elevator shaft system having at least two vertical shafts and at least two transfer stations forming a common circular path for the plurality of elevator cars; the plurality of the elevator cars and the elevator shaft system comprising a plurality of elevator components, at least some of the plurality of the elevator components are equipped at least one sensor adapted to generate measurement data representing an operational condition of a respective elevator component; a controller communicatively connected at least to the elevator components equipped with the sensor for receiving the measurement data; the method, performed by an elevator maintenance system, comprising: receiving the measurement data; determining the operational condition of the respective elevator component on a basis of the received measurement data; and generating a maintenance signal for the at least one elevator component, the maintenance signal is scheduled in accordance with the operational condition of the respective at least one elevator component before a failure of the at least one elevator component.

According to a third aspect, a computer program product for performing a maintenance of a multicar elevator system is provided which computer program product, when executed by at least one processor, cause an elevator maintenance system of the multicar elevator system to perform the method according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

At least some aspects of the present invention relate to a multicar elevator system comprising an elevator maintenance system. The elevator maintenance system of the multicar elevator system provides a possibility to estimate remaining operating time of different components of the multicar elevator system, and to schedule maintenance visits before any failure which could potentially interrupt the elevator service.

Figure 1:
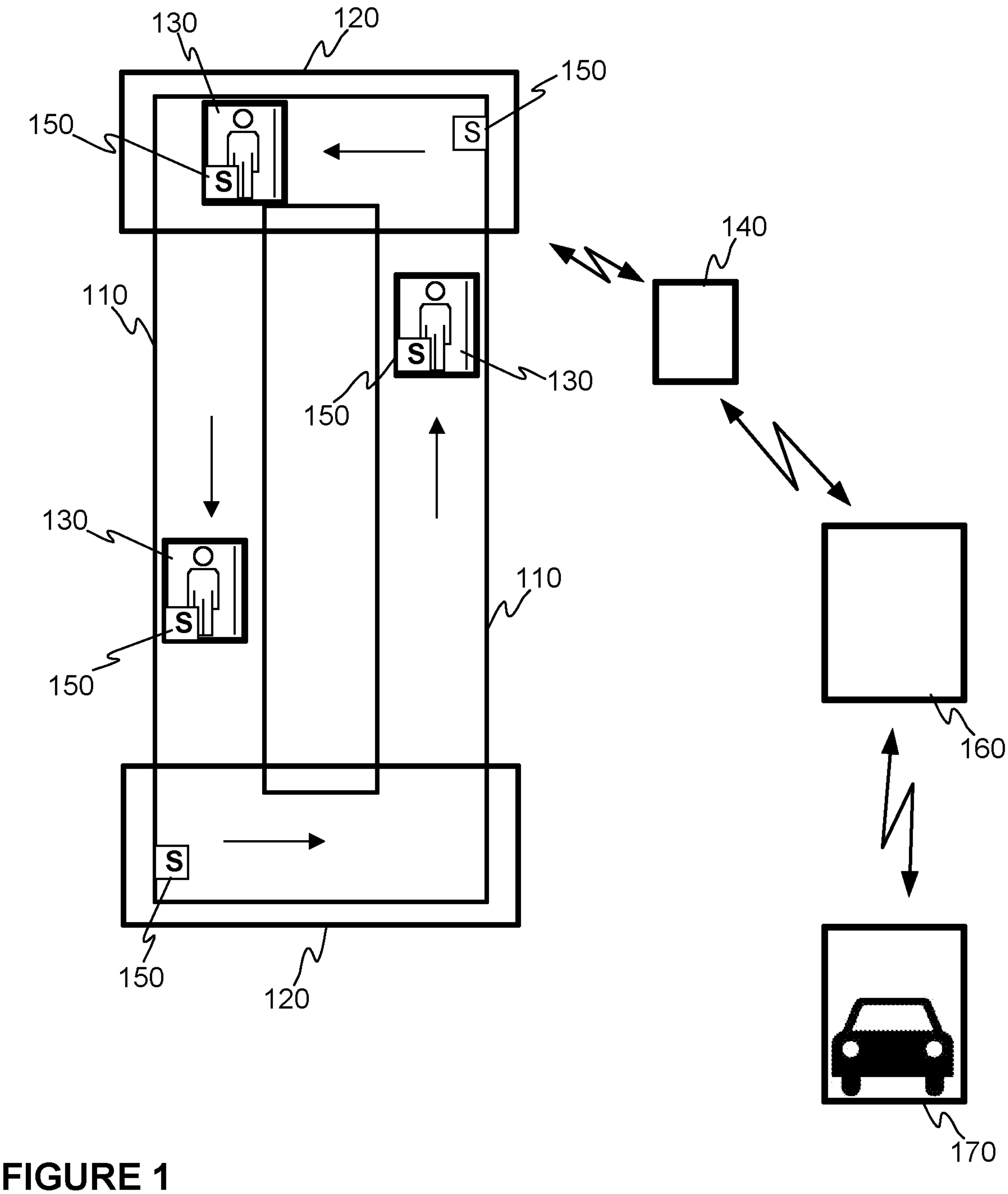
FIG. 1 illustrates schematically a multicar elevator system according to an example.

FIG. 1 illustrates schematically an example of a multicar elevator system comprising the elevator maintenance system in accordance with an example. The multicar elevator system, and especially an elevator shaft system may comprise at least two vertical shafts 110 and at least two transfer stations 120. The transfer station 120 may comprise a horizontal shaft section for horizontal movement of an elevator car 130 from one vertical shaft 110 to another. Further, the multicar elevator system may comprise a plurality of elevator cars 130 which are arranged to travel along a common circular path formed by the at least two vertical shafts 110 and the at least two transfer stations 120. As derivable above, the multicar elevator system may comprise more than two vertical shafts 110 and two transfer stations 120. In a non-limiting example of FIG. 1 the multicar elevator system comprises three elevator cars 130 arranged to travel in the same direction in the common circular path. The travel direction is indicated with arrows in FIG. 1.

In accordance with the present example both the elevator shaft system and the elevator cars 130 may be equipped so that a travel of each elevator car 130 is individually controllable i.e. a motion of the elevator car 130 is not dependent on the motion of the other elevator cars 130. For example, one elevator car 130 may be on move even if two other elevator cars 130 reside still at floors for loading/unloading. This kind of implementation requires that it is possible to generate a propulsion force individually to the elevator cars 130. According to an example, the multicar elevator system may e.g. be implemented so that the plurality of the elevator cars 130 are equipped with a motor secondary and the elevator shaft system is equipped with a motor primary beam structure comprising a plurality of longitudinal primary beams for forming the common trajectory for the circular motion of the elevator cars 130. Each motor primary beam may be configured to co-act with the motor secondary of each of the plurality of the elevator cars so as to cause a motion of the elevator cars 130 in the multicar elevator system. For example, a linear motor for generating the propulsion force may be implemented so that the motor primary beam structure functions as a stator of the linear motor and the motor secondary in the elevator car 130 is a more (i.e. rotor) of the linear motor.

For sake of clarity, it is worthwhile to mention that the turning stations 120 may be implemented so that they comprise a rotatable primary beam section for enabling the elevator car 130 to travel either vertically or horizontally in accordance with a direction of the primary beam. The rotatable primary beams residing in the turning stations 130 may be controlled with an apparatus called as a controller 140. The controller 140 may also take care of other control operations of the multicar elevator system, such as receiving elevator calls from users of the multicar elevator system and allocating elevator cars 130 to provide a service for the elevator calls. The controller 130 may be communicatively connected to other entities in the multicar elevator system so as to receive and transmit signals in accordance with an operation of the multicar elevator system. The communicative connection may be implemented either in a wired manner or wirelessly.

In accordance with at least some examples the multicar elevator system comprises a plurality of elevator components. The elevator components may e.g. refer to devices and components installed in the elevator cars 130 or in the elevator shaft system, and forming at least a portion of the mentioned entities, and, possibly, configured to cooperate with other entities of the multicar elevator system. In the following some non-limiting examples of the components are provided:

Elevator Car:
- door operator, if any
- battery
- linear motor secondary
- drive unit of the linear motor (e.g. an inverter unit)
- position and movement sensor of elevator car
- safety chain of elevator car
- car operation panel
- wireless data transceiver unit
- car brake unit
- car lighting unit Elevator Shaft System:
- wireless charger
- landing operation nodes
- landing door safety node
- pit safety and inspection node
- landing call unit
- DOP, destination call interface, disposed in landing or lounge
- elevator control unit
- master safety controller
- shaft lighting unit At least some of the elevator components belonging to the multicar elevator system may be equipped with a sensor 150 for generating measurement data representing an operational condition of a respective elevator component. The term sensor shall be interpreted in a broad manner and it may be implemented as a discrete component coupled to the respective elevator component or it may be any entity in the respective elevator component on which it is possible to obtain suitable data, called as measurement data, which represents, either directly or indirectly, the operational condition of the elevator component in question. The measurement data from the sensor 150 may e.g. be delivered through the respective elevator component to the controller 140 which are communicatively connected to each other in applicable manner either directly or indirectly. Alternatively or additionally, at least some of the sensors 150 may be connected to a controller 140 via separate wired or wireless sensor data bus.

The multicar elevator system as already described in the foregoing description may further comprise an elevator maintenance system 160 which may be configured to receive the measurement data over a communication connection setup between the controller 140 and the elevator maintenance system 160, which communication connection may be implemented either in a wired manner or wirelessly. For sake of completeness it is worthwhile to mention that the measurement data received by the elevator maintenance system 160 may be raw data obtained by the sensor 150 in question, or it may be the measurement data pre-processed in some manner at least by one of the entities through which it is delivered to the elevator maintenance system 160, such as by the controller 140, or by the elevator component, or even by the sensor 150. In response to a receipt of the measurement data the elevator maintenance system 160 may be configured to determine an operational condition of the respective elevator component on a basis of the received measurement data. The determination of the operational condition may e.g. refer to a process wherein the elevator maintenance system 160 may compare at least one value of the measurement data, or any other value derivable from the measurement data, to a reference value and generate an indication representing the operational condition of the elevator component. The indication may be based on statistical data and/or data trends. Additionally or alternatively, it may be based on mathematical models, such as model representing lifetime of elevator component based on loading, operational cycles, temperature etc. Mathematical model may also be based on artificial intelligence, such that there is a teaching procedure to update the model in the long run. The reference value may e.g. be at least one previous measurement value received from the same elevator component, or any statistically determined value from one or more previous measurement data values. Alternatively or in addition, the reference value may be received from a manufacturer of the elevator component or from any other source. The reference value is advantageously defined so that it is possible to receive such information through the comparison by means of which it is possible to make decisions with respect to the elevator component. For example, in accordance with an example embodiment, the decision-making may generate a maintenance signal, i.e. a signal containing e.g. maintenance related information and/or a data record called as a maintenance order for the elevator component in question. The maintenance signal may carry data, e.g. in the form of the maintenance order, defining information for a maintenance operation of the elevator component in question, such as to indicate an instant of time at which a maintenance operation shall be performed to the elevator component in question in order to avoid a failure in the elevator component, and, hence, in the multicar elevator system. For example, in response to a receipt of the measurement data at least one value of the measurement data is compared to one or more reference values and in response to a determination of a match with a reference value, such as the measurement data value is within a predefined reference value range, an indication of the instant of time of a maintenance corresponding to the reference value range may be obtained from data storage. As a result, a maintenance signal for the at least one elevator component may be generated so that the maintenance work is scheduled in accordance with the operational condition of the at least one elevator component. By performing a scheduling of the maintenance work with respect to at least some of the elevator components in the described manner, e.g. before a failure of the at least one elevator component, it is possible to improve a utilization rate of the multicar elevator system.

The maintenance may be fulfilled during a maintenance visit. Maintenance visits will be scheduled in advance in a service center or in a cloud, to a time period before any estimated component failures. Each maintenance visit contains selected maintenance operations to be performed in elevator site by maintenance personnel.

In some example embodiments the elevator maintenance system 160 may receive the measurement data from a plurality of elevator components. The elevator maintenance system 160 may be configured to perform a process for determining a schedule of the maintenance for each of the elevator components from which the measurement data is received and to generate the maintenance signal accordingly. According to an example, the elevator components may be provided as a list e.g. in the maintenance order disclosing the elevator components so that the one requiring the maintenance first is listed top-most and the rest of the elevator components are listed in a decreasing order.

In accordance with any of the examples discussed in the foregoing description the data carried in the maintenance signal, such as in the data record called as the maintenance order, may advantageously be drafted, i.e. generated, so that it comprises data defining the instant of time of the maintenance. Additionally, it may comprise data identifying the one or more elevator components listed in the maintenance data. Still further, it may comprise further information, such as location information on the elevator component in question (in particular the location at the time of the maintenance) as well as other related data like status information of the elevator component(s) in question, data for on-site identification of the respective elevator component(s) (such as a description of an outlook of the component or even a picture of it), required tools and/or software updates for the maintenance, and so on. Generally speaking, status information may refer to a measured or an estimated condition of an elevator component at the time of maintenance, which information may help the maintenance personnel in evaluating a possible cause of failure and/or in a maintenance of a component. Such information may include vibration characteristics of the elevator component, voltage/current/power characteristics of the elevator component, a component temperature, data log recorded in connection with an operational anomaly, etc.

For sake of completeness, some non-limiting examples of the status information are provided in the following:

- Information representing a condition and/or lifetime estimate of each battery
- Motor/car vibration levels
- Maximum operating temperatures of drive units
- Rail condition by emf (electromotive force) measurement info
- Stator rail/guide rail dirtiness by capacitive measurement
- Wearing levels for each brake shoe
- Door opening torque levels of the door operator vs. maintenance need In implementations in which the elevator maintenance system 160 may include, or utilize, elevator component related data e.g. into the maintenance signal, such as including at least some pieces of data in the maintenance data, the maintenance system 160 may be configured to retrieve such pieces of data from data storage storing such data.

In accordance with some example embodiments the elevator maintenance system is remote to the multicar elevator system. For example, the elevator maintenance system 160 may be implemented with at least one computing device residing in a communication network, such as accessible through Internet. Hence, the elevator maintenance system 160 may be implemented as a single computing device, such as a server device, or it may be implemented as a distributed computing environment in which the operation is performed by a plurality of computing device i.e. as a cloud computing solution. In some embodiments the elevator maintenance system 160 may contain computing devices some of which disposed remotely and some on-site, implementing e.g. edge computing technologies.

Still further, the elevator maintenance system 160 may be communicatively connected to a further entity 170, such as to an operator or a service center taking care of the maintenance of the multicar elevator system. Hence, the elevator maintenance system 160 may deliver at least a portion of the maintenance data included in the maintenance signal to a maintenance operator entity 170 and indicate e.g. a schedule of the maintenance work thereto. For example, the communication between the elevator maintenance system 160 and the maintenance operator entity 170 may be arranged to occur under a predetermined schedule. The maintenance operator entity 170 may refer to a system, or device, configured to receive at least the portion of the maintenance data, interpret the data, and to generate signal, such as alerts, to one or more systems of the maintenance operator to provide information to technicians and other operators e.g. as regards to schedules of the maintenance.

According to some example embodiments the multicar elevator system as described with the non-limiting examples in the foregoing description may be operatively implemented so that it is run at least in two alternative operational modes scheduled to operate at different periods of time. The first operational mode may be applied to at high-traffic hours whereas the second operational mode may be applied to at low-traffic hours. For example, in the first operational mode the elevator cars 130 of the multicar elevator system may be arranged to move in the circular path consecutive to each other. Correspondingly, in the second operational mode the operation, i.e. at least the motion, of the elevator cars 130 may be arranged in a different way, such as at least one of the elevator cars 130 may be in a non-circulating motion being even in a non-running idle mode. In such an operational environment the maintenance, such as a maintenance work defined in the data carried in the maintenance work, may be scheduled so that it occurs during the second operational mode corresponding to the low-traffic hours. This kind of approach disturbs the users of the multicar elevator system in a minimal way. Generally speaking, the number of the operational modes may vary from two so that a quality of service may be maintained optimal in the operational environment of the multicar elevator system.

Moreover, the multicar elevator system may be implemented so that the elevator shaft system comprises a maintenance space or a separate shaft section arranged outside of the circular path the elevator cars 130 travel to. In other words, one or more elevator cars 130 may be instructed to access the maintenance space by generating a control signal by the controller 140 to the elevator car 130 in question based e.g. on the maintenance signal. The generation of the control signal may be such that car will be instructed to enter the maintenance space before any forecasted/estimated elevator component failure. This way maintenance schedule will be more flexible, as the elevator car 130 will not be blocking other elevator cars 130 if it fails, but it will be in the separate maintenance space waiting for maintenance. This kind of embodiment may be implemented by sending the maintenance signal to the controller 140 or arranging the elevator maintenance system 160 to provide at least a portion of the maintenance data included in the maintenance signal, such as in a maintenance order, to the controller 140 for generating the control signal as described.

For sake of completeness it is worthwhile to mention an embodiment in which the elevator maintenance system 160 may be configured to communicate with a plurality of multicar elevator systems i.e. it may belong to a plurality of the multicar elevator systems and configured to perform the task as described. For example, the plurality of multicar elevator systems may locate at different geographical locations. Hence, the elevator maintenance system may be configured to estimate the need for maintenance of the respective multicar elevator systems in the preventive manner for a plurality of systems, and, even, to utilize the information received from the multicar elevator systems in a centralized manner.

Figure 2:
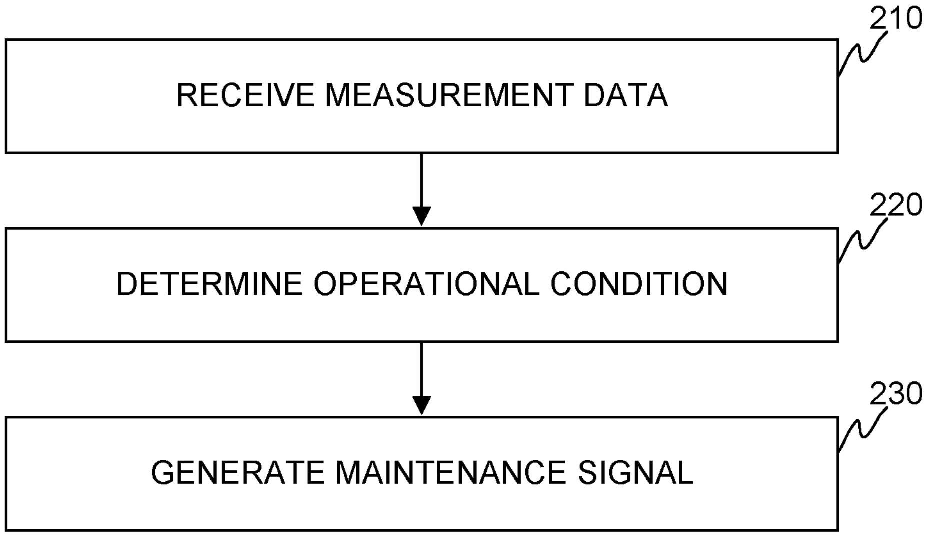
FIG. 2 illustrates schematically a method according to an example.

According to an example embodiment, an elevator maintenance system 160 is configured to perform a method as schematically illustrated in FIG. 2. First, the elevator maintenance system 160 may be configured to receive 210 measurement data from one or more controllers 140. As described in the foregoing description each controller 140 may receive the measurement data from a number of elevator components, such as from the respective sensors 150, and deliver it to the elevator maintenance system 160 as a raw data or in a pre-processed form. In response to the receipt of the measurement data from the at least one controller 140 the elevator maintenance system 160 may be arranged to determine 220 an operational condition of the at least one elevator component on which the elevator maintenance system 160 has received the measurement data. The determination of the operational condition 220 may be performed by analyzing one or more values of the measurement data in a predetermined manner, such as by comparing at least one of them, or any value derived from the measurement data, to a respective reference value. Finally, based on the determination 220 of the operational condition the elevator maintenance system 160 may be configured to generate 230 a maintenance signal carrying data defining at least one maintenance related operation for the at least one elevator component. According to the example embodiment the maintenance may be scheduled in accordance with the operational condition of the respective at least one elevator component before a failure of the at least one elevator component. In other words, the elevator maintenance system 160 may be arranged to generate the maintenance signal so that the maintenance data with respect to the elevator components included in the maintenance signal defines that the maintenance operation may be performed before an estimated breakage of the respective elevator component.

Further aspects with respect to the method are described in the foregoing description of the multicar elevator system.

Figure 3:
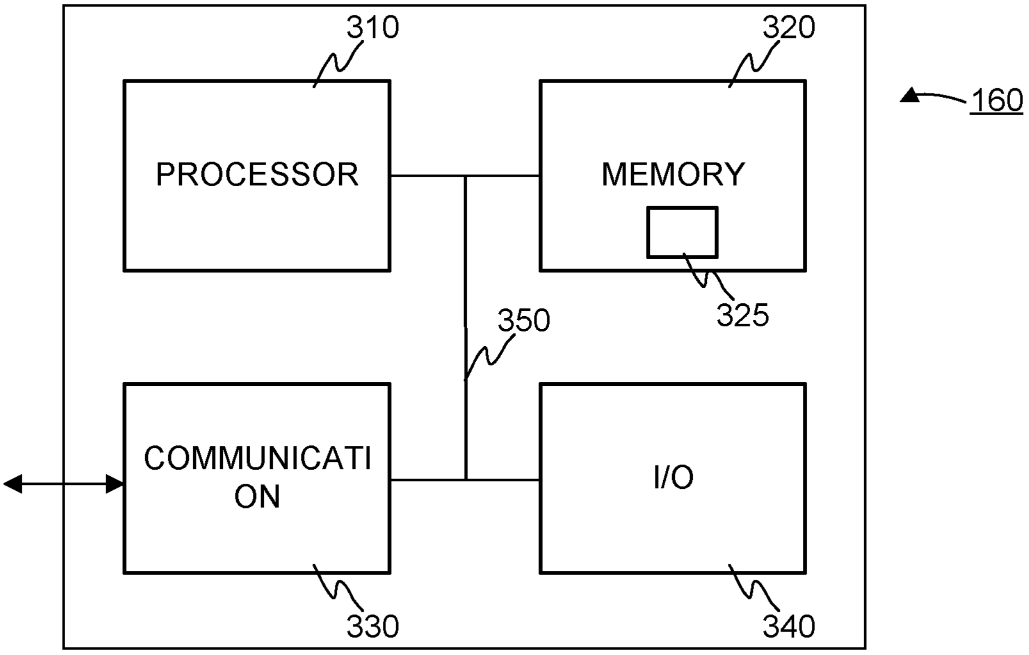
FIG. 3 illustrates schematically an apparatus for performing a functionality of an elevator maintenance system according to an example.

For example, an apparatus configured to perform a functionality of the elevator maintenance system 160 as described may refer to a computing device, such as a server device, a laptop computer, a PC, or any similar data processing device, as schematically illustrated in FIG. 3. FIG. 3 illustrates schematically as a block diagram a non-limiting example of the apparatus applicable to perform the method as described in FIG. 2 in cooperation with other entities if necessary. For sake of clarity, it is worthwhile to mention that the block diagram of FIG. 3 depicts some components of a device that may be employed to implement an operation of the apparatus. The apparatus comprises a processor 310 and a memory 320. The memory 320 may store data and computer program code 325. The apparatus may further comprise communication means 330 for wired and/or wireless communication with other entities. Furthermore, I/O (input/output) components 340 may be arranged, together with the processor 310 and a portion of the computer program code 325, to provide a user interface for receiving input from a user, such as from a technician of the maintenance operator, and/or providing output to the user of the system when necessary. In particular, the user I/O components may include user input means, such as one or more keys or buttons, a keyboard, a touchscreen, or a touchpad, etc. The user I/O components may include output means, such as a display or a touchscreen. The components of the apparatus may be communicatively coupled to each other via a bus 350 that enables transfer of data and control information between the components.

The memory 320 and a portion of the computer program code 325 stored therein may be further arranged, with the processor 310, to cause the apparatus, i.e. the device, to perform a method as described in the foregoing de-scription in relation to FIG. 3. The processor 310 may be configured to read from and write to the memory 320. Although the processor 310 is depicted as a respective single component, it may be implemented as respective one or more separate processing components. Similarly, although the memory 320 is depicted as a respective single component, it may be implemented as respective one or more separate components, some or all of which may be integrated/removable and/or may provide permanent/semi-permanent/dynamic/cached storage.

The computer program code 325 may comprise computer-executable instructions that implement functions that correspond to steps of the method when loaded into the processor 310. As an example, the computer program code 325 may include a computer program consisting of one or more sequences of one or more instructions. The processor 310 is able to load and execute the computer program by reading the one or more sequences of one or more instructions included therein from the memory 320. The one or more sequences of one or more instructions may be configured to, when executed by the processor 310, cause the apparatus to perform the method be described herein. Hence, the apparatus may comprise at least one processor 310 and at least one memory 320 including the computer program code 325 for one or more programs, the at least one memory 320 and the computer program code 325 configured to, with the at least one processor 310, cause the apparatus to perform the method as described.

The computer program code 325 may be provided e.g. a computer program product comprising at least one computer-readable non-transitory medium having the computer program code 325 stored thereon, which computer program code 325, when executed by the processor 310 causes the apparatus to perform the method. The computer-readable non-transitory medium may comprise a memory device or a record medium such as a CD-ROM, a DVD, a Blu-ray disc, or another article of manufacture that tangibly embodies the computer program. As another example, the computer program may be provided as a signal configured to reliably transfer the computer program.

Still further, the computer program code 325 may comprise a proprietary application, such as computer program code for causing an execution of the method in the manner as described in the description herein.

Any of the programmed functions mentioned may also be performed in firm-ware or hardware adapted to or programmed to perform the necessary tasks.

Moreover, as mentioned a functionality of the apparatus may be shared between a plurality of devices as a distributed computing environment. For example, the distributed computing environment may comprise a plurality of devices as schematically illustrated in FIG. 3 arranged to implement the method in cooperation with each other in a predetermined manner. For example, each device may be arranged to perform one or more method steps and in response to a finalization of its dedicated step it may hand a continuation of the process to the next device.

The controller 140 may be implemented with a similar apparatus as schematically illustrated in FIG. 3. Naturally, it is configured, e.g. with the computer program code 325, to perform its tasks as described. Additionally, the communication connections with the other entities, such as with the elevator components equipped with applicable sensors 150, are established, respectively.

The present invention as described with example embodiments in the foregoing description provides a solution for preventing down-time of a multicar elevator system. This may be achieved by determining a need to maintenance of at least some of the elevator components through determining an operational condition of the elevator components e.g. at predefined intervals in the manner as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A multicar elevator system, comprising:

a plurality of individually controllable elevator cars;

an elevator shaft system having at least two vertical shafts and at least two transfer stations forming a common circular path for the plurality of elevator cars;

the plurality of the elevator cars and the elevator shaft system comprising a plurality of elevator components, at least some of the plurality of the elevator components are equipped with at least one sensor adapted to generate measurement data representing an operational condition of a respective elevator component;

a controller communicatively connected at least to the elevator components equipped with the sensor for receiving the measurement data;

the multicar elevator system further comprising:

an elevator maintenance system configured to:

receive the measurement data;

determine the operational condition of the respective elevator component on a basis of the received measurement data; and generate a maintenance signal carrying maintenance data comprising data defining an instant of time of a maintenance for performing the maintenance of at least one elevator component among the plurality of elevator components, the maintenance is scheduled in accordance with the operational condition of the respective at least one elevator component before a failure of the at least one elevator component, the maintenance signal including a maintenance order defining information for a maintenance operation including time of the maintenance operation and elevator component among the at least one elevator components, wherein the controller of the multicar elevator system is configured to run the multicar elevator system in one of the following operational modes:

a first operational mode in which the individually controllable elevator cars are arranged to move in the circular path consecutive to each other;

a second operational mode in which a motion of at least one of the individually controllable elevator cars deviates from a circular motion along the circular path;

and wherein the elevator maintenance system is configured to schedule at least one maintenance work indicated in the maintenance signal to the second operational mode.

2. The multicar elevator system of claim 1, wherein the elevator maintenance system is remote to a location where the plurality of elevator cars is arranged to operate.

3. The multicar elevator system of claim 2, wherein the elevator maintenance system is arranged communicatively connected to a maintenance operator entity for a delivery of at least a portion of the maintenance data.

4. The multicar elevator system of claim 2, wherein the individually controllable elevator cars and the elevator shaft system are implemented in the multicar elevator system so that a motor primary of a linear motor is implemented in the elevator shaft system and a motor secondary of a linear motor is implemented in the individually controllable elevator cars.

5. The multicar elevator system of claim 2, wherein each of the at least two transfer stations comprises a horizontal shaft section for horizontal movement of individually controllable elevator cars from one vertical shaft to another.

6. The multicar elevator system of claim 1, wherein the elevator maintenance system is arranged communicatively connected to a maintenance operator entity for a delivery of at least a portion of the maintenance data.

7. The multicar elevator system of claim 6, wherein the individually controllable elevator cars and the elevator shaft system are implemented in the multicar elevator system so that a motor primary of a linear motor is implemented in the elevator shaft system and a motor secondary of a linear motor is implemented in the individually controllable elevator cars.

8. The multicar elevator system of claim 1, wherein the individually controllable elevator cars and the elevator shaft system are implemented in the multicar elevator system so that a motor primary of a linear motor is implemented in the elevator shaft system and a motor secondary of a linear motor is implemented in the individually controllable elevator cars.

9. The multicar elevator system of claim 1, wherein each of the at least two transfer stations comprises a horizontal shaft section for horizontal movement of individually controllable elevator cars from one vertical shaft to another.

10. The multicar elevator system of claim 1, wherein the elevator shaft system comprises at least one maintenance space arranged outside of the common circular path the individually controllable elevator cars are arranged to travel;

and wherein the controller is configured to generate a control signal to at least one elevator car for accessing the maintenance space based on data included in the maintenance signal.

11. The multicar elevator system of claim 1, wherein the maintenance signal comprises data identifying the at least one elevator component subject to the maintenance.

12. The multicar elevator system of claim 1, wherein the maintenance signal comprises data representing a location of the at least one elevator component subject to the maintenance.

13. The multicar elevator system of claim 1, wherein the maintenance signal comprises data defining status of the at least one elevator component subject to the maintenance.

14. The multicar elevator system of claim 1, wherein the maintenance signal comprises data for on-site identification of the at least one elevator component subject to the maintenance.

15. The multicar elevator system of claim 1, wherein the maintenance signal comprises data indicating tools and/or software update for the maintenance of the at least one elevator component subject to the maintenance.

16. The multicar elevator system of claim 1, wherein the elevator maintenance system is integrated in a plurality of multicar elevator systems locating at different geographical locations for generating maintenance signals for the plurality of the multicar elevator systems.

17. The multicar elevator system of claim 1, wherein the elevator maintenance system is configured to send the maintenance signal to the controller.

18. A method for performing a maintenance of a multicar elevator system, the multicar elevator system comprising:

a plurality of individually controllable elevator cars;

an elevator shaft system having at least two vertical shafts and at least two transfer stations forming a common circular path for the plurality of elevator cars;

the plurality of the elevator cars and the elevator shaft system comprising a plurality of elevator components, at least some of the plurality of the elevator components are equipped at least one sensor adapted to generate measurement data representing an operational condition of a respective elevator component;

a controller communicatively connected at least to the elevator components equipped with the sensor for receiving the measurement data;

the method, performed by an elevator maintenance system, comprising:

receiving the measurement data;

determining the operational condition of the respective elevator component on a basis of the received measurement data; and generating a maintenance signal carrying maintenance data comprising data defining an instant of time of a maintenance for performing the maintenance of at least one elevator component among the plurality of elevator components, the maintenance is scheduled in accordance with the operational condition of the respective at least one elevator component before a failure of the at least one elevator component, the maintenance signal including a maintenance order defining information for a maintenance operation including time of the maintenance operation and elevator component, wherein the controller of the multicar elevator system is configured to run the multicar elevator system in one of the following operational modes:

a first operational mode in which the individually controllable elevator cars are arranged to move in the circular path consecutive to each other;

a second operational mode in which a motion of at least one of the individually controllable elevator cars deviates from a circular motion along the circular path;

and wherein the elevator maintenance system is configured to schedule at least one maintenance work indicated in the maintenance signal to the second operational mode.

19. A computer program product for performing a maintenance of a multicar elevator system which, when executed by at least one processor, cause an elevator maintenance system of the multicar elevator system to perform the method according to claim 18.

* * * * *